United States Patent [19]

Agrawal et al.

[11] Patent Number: 5,342,578
[45] Date of Patent: Aug. 30, 1994

[54] CORROSION INHIBITION OF AMMONIA-WATER ABSORPTION CHILLERS

[75] Inventors: Arun K. Agrawal, Columbus; Barry Hindin, Reynoldsburg, both of Ohio

[73] Assignee: Gas Research Institute, Chicago, Ill.

[21] Appl. No.: 21,494

[22] Filed: Feb. 23, 1993

[51] Int. Cl.$^5$ .............................. C23F 11/06
[52] U.S. Cl. ........................ 422/13; 252/385; 252/387; 252/389.3; 62/101; 62/476; 62/DIG. 20
[58] Field of Search ............... 422/13; 252/385, 387, 252/389.3; 62/101, 476, DIG. 20

[56] References Cited

U.S. PATENT DOCUMENTS

| | | | |
|---|---|---|---|
| 2,961,291 | 11/1960 | Pickett et al. | 21/2.7 |
| 2,972,581 | 2/1961 | Johnson et al. | 252/389.3 |
| 3,101,277 | 8/1963 | Eder et al. | 62/DIG. 20 |
| 3,215,637 | 11/1965 | Clerbois | 252/68 |
| 3,312,622 | 4/1967 | Pines et al. | 252/75 |
| 4,098,720 | 7/1978 | Hwa | 252/389 R |
| 4,382,008 | 5/1983 | Boreland et al. | 252/75 |
| 4,404,114 | 9/1983 | Mohr et al. | 62/DIG. 20 |
| 4,612,134 | 9/1986 | Pierce et al. | 252/75 |
| 4,724,125 | 2/1988 | Tsuneki et al. | 422/17 |
| 4,915,872 | 4/1990 | Ciuba et al. | 252/389.3 |
| 4,961,878 | 10/1990 | Mullins | 252/389.3 |

OTHER PUBLICATIONS

Agrawal et al., A. K. "Corrosion and Corrosion of Cracking Materials for Water Cooled Reactors." *EPRI Progress Report-FCC* 7801, The Ohio States University, Columbus, Ohio (1978), pp. 139-142, 151, 167 and 173.

Primary Examiner—Timothy M. McMahon
Attorney, Agent, or Firm—Watkins, Dunbar & Pollick

[57] ABSTRACT

A method of inhibiting corrosion in ammonia-water absorption machines that includes adding to an ammonia-water solution soluble silicon compounds. Examples of these silicon compounds include sodium silicate ($Na_2SiO_3$), potassium silicate ($K_2SiO_3$), lithium silicate ($Li_2SiO_3$), silicic acid ($H_2SiO_5$), and tetramethoxysilane ($CH_3O)_4Si$. Sodium silicate is revealed as the preferred embodiment.

7 Claims, 4 Drawing Sheets

CORROSION INHIBITION OF AMMONIA-WATER ABSORPTION CHILLERS

FIELD OF THE INVENTION

This invention relates to chemical corrosion inhibitors that are frequently provided in absorption refrigeration chillers and machines for the prevention and reduction of corrosion in the internal components of the apparatus. More particularly it relates to ammonia-water solution soluble, silicon corrosion inhibitor compounds that are particularly useful in ammonia-water absorption cycles.

BACKGROUND OF THE INVENTION

Although other cycles have been identified and used in absorption refrigeration heat pump and refrigeration equipment applications, ammonia-water (AW) absorption cycles remain an attractive approach to gas-fired, compact, air-cooled, air conditioning, heat pumping, and refrigeration equipment. However, for these cycles to continue to be accepted by the marketplace, long equipment lifetimes and low maintenance are essential. To do this, corrosion must be kept to a minimum. Present systems use a chromate corrosion inhibitor that many consider to be hazardous.

Carbon steel is the material of choice for constructing ammonia-water refrigeration machines. The use of inexpensive materials such as carbon steel is necessary because of the cost sensitive nature of the ammonia-water market. However, steels are susceptible to corrosion in the highly alkaline environment. Corrosion of steel not only shortens the life of a machine but also reduces its efficiency due to buildup of hydrogen gas that is generated by corrosion processes. The accepted practice to minimize corrosion in this system is by adding a corrosion inhibitor to the refrigerant.

The most widely used inhibitor in commercially available AW systems is sodium chromate, which has been found to provide adequate protection against corrosion for this application. However, chromate-base compounds are toxic and some forms are known to be carcinogenic. In recent years there has been increasing restrictions put on the use of chromate-based compounds by regulatory agencies because of health and environmental concerns. Therefore, there is an urgency to find an effective and environmentally acceptable non-chromatic inhibitor for refrigeration machines.

Ammonia-water (AW) refrigeration machines require an inhibitor to protect the internal wetted steel parts from corrosion. The inhibitor most widely used by the heating, ventilation, and air conditioning (HVAC) industry is sodium chromate. However, because of the toxicity of hexavalent chromium in the chromate, the inhibitor is considered an environmental pollutant, and is likely to be prohibited for use in many localities. Alternative inhibitors are needed or required to replace the sodium chromate in the AW machines.

It has been reported that the presence of silicate ions improves the tensile strength of Type 403 stainless steel in aqueous solutions at pH 7 to 12.2 at 212° F. (100° C.). However, it is also well known that the presence of ammonia can make a significant difference in solution chemistry. It can be shown that many inhibitors that function in aqueous systems (water only) will not function once the ammonia exceeds a critical concentration.

Corrosion and inhibition in aqueous ammonia systems will be very important to the future HVAC industry if anyone of a variety of aqueous ammonia gas-fired air conditioners or heat pumps reach the marketplace. Therefore, the distinction of using valuable alkali salts in ammonia water cycles is very important.

For the most part, the prior art reveals the use of alkali salt silicates in so-called "antifreeze" compositions to inhibit corrosion in the radiator's components of heat transfer machines, particularly automobiles. In the case of ammonia water machines simultaneous heat and mass transfer occur, whereas in automobile radiators and other heat exchangers only heat transfer takes place. Therefore, the prior art has not revealed the effects of inhibitors on components exposed to simultaneous heat and mass transfer operations. Examples in the prior art of prior usage are as follows:

U.S. Pat. No. 4,961,878 Mullins discloses a composition for inhibiting metal corrosion in a closed aqueous cooling system comprising an aqueous mixture of a nitrate, a silicate, an acrylate polymer, an amine oxide and tolyltriazole. The silicate is introduced as a sodium salt.

U.S. Pat. No. 4,915,872 Ciuba et al. shows a solid cast block of corrosion inhibitor comprising about 5 to 20 wt % silicate, calculated as sodium metasilicate pentahydrate, about 5 to 90 wt % borate, calculated as sodium tetraborate pentahydrate, about 0.5 to 5 wt % polymeric dispersant such as polyacrylamide, and a sufficient solidifying amount of water.

U.S. Pat. No. 4,098,720 Hwa reveals low toxicity, low pollution potential compositions and methods for inhibiting corrosion of ferrous and non-ferrous metallic parts in aqueous systems. The compositions include an alkali metal silicate and small amounts of alkali metal hydroxide.

U.S. Pat. No. 4,724,125 Tsuneki et al. discloses metal materials in contact with aqueous systems are prevented from corrosion by a method which comprises adding copolymer having a molecular weight in range of 1,000 to 20,000 and formed between isobutylene and at least one member selected from among maleic acid, water-soluble salts thereof, and maleic anhydride of water of such quality that the Langelier index is not less than 1.5 and the relation $(SiO_2) \times (CaH)$ is greater than or equal to 2000 where $SiO_2$ stands for the $SiO_2$ concentration in the water (mg/liter) and (CaH) for the calcium hardness (mg/liter as $CaCO_3$) in water.

U.S. Pat. No. 4,382,008 Boreland et al. reveals corrosion inhibitors for aqueous media comprising a triazole, an alkali metal borate, benzoate, silicate and an alkali metal salt of $C_7$ to $C_{13}$ dibasic acid. These inhibitors may be used in antifreeze compositions.

U.S. Pat. No. 3,215,637 Clerbois shows a process for the protection of metals against the corrosive action of brines which contains a mixture of sodium silicate and zinc chloride in selected proportions to inhibit corrosion by sodium chloride and calcium chloride brines.

U.S. Pat. No. 2,972,581 Johnson et al. reveals a corrosion inhibitor and cooling solution consisting of mercaptobenzothizole, alkali metal salts, an alkali metal silicate, and alkali metal nitrite, and an alkali metal borate.

The various prior art disclosures do not reveal the use of silicon compounds that are useful in ammonia-water absorption cycles and in association with ammonia and water solutions.

SUMMARY

This invention is a method of inhibiting corrosion in apparatus employing ammonia-water absorption cycles comprising charging the apparatus with an aqueous solution of ammonia and water and dissolving in the ammonia-water solution a corrosion-inhibiting silicon compound that is soluble and stable in the ammonia and water solution. Preferably, the solution soluble silicon compound is an alkali metal silicate such as sodium silicate ($Na_2SiO_3$) which is most preferred. Potassium silicate ($K_2SiO_3$) has been found also to be beneficial and it is believed that other solution soluble silicon compounds such as lithium silicate ($Li_2SiO_3$), silicic acids such as $H_2SiO_5$ and organic silicon compounds such as the alkoxysilanes, e.g., $(CH_3O)_4Si$ and mixtures of these compounds will provide beneficial, corrosion-inhibiting results. Ammonia-water solution soluble silicon compounds such as sodium silicate have been shown to be effective in ammonia-water absorption cycles operating above at least 200° F. (93° C.) with ammonia-water solutions having fifteen or more weight percent ammonia.

DETAILED DESCRIPTION OF THE INVENTION WITH EXAMPLES AND TESTS

Figure 1:
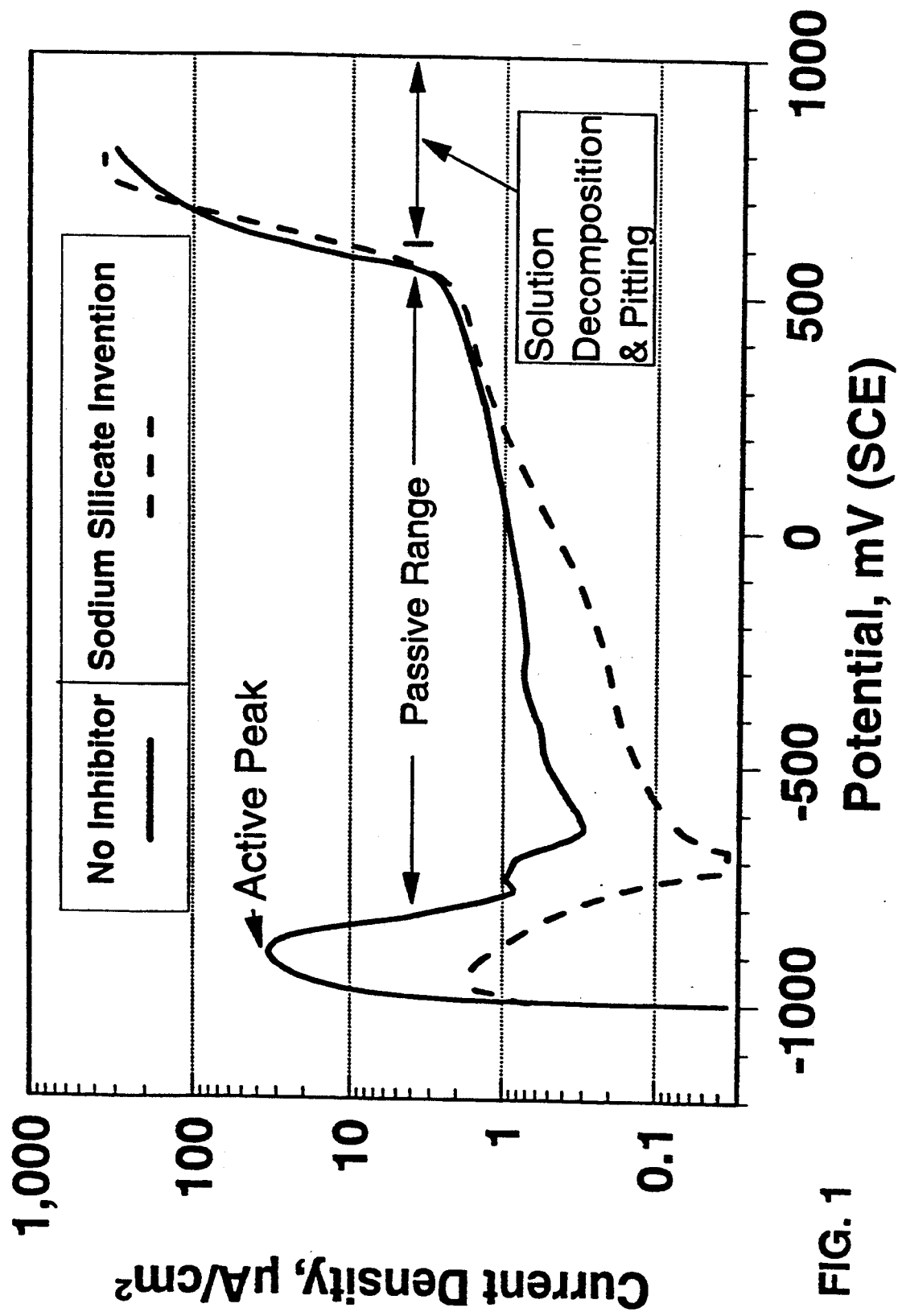
FIG. 1 discloses anodic polarization curves of C1018 carbon steel in 30% ammonia solutions without inhibitor and with sodium silicate inhibitor.

In order to demonstrate the corrosion inhibiting efficacy method of this invention various tests were conducted from sample coupons emersed in typical environments of ammonia-water solution operations in absorption cycles. The coupon immersion tests consisted of exposing coupons of 3 different alloys in various ammonia-water solutions, containing the most promising inhibitors at elevated temperatures, for various lengths of times. The alloys tested included AISI C1018 carbon steel, chrome-plated C1018 carbon steel and ASTM A387 Grade 22 alloy steel (2.25 Cr, 1 Mo). The effectiveness of the inhibitors was evaluated by how well they protected the immersion coupons after a prolonged exposure at elevated temperatures in ammonia-water solutions. This evaluation consisted of measuring the corrosion rate of the coupon using gravimetric technique. This technique uses the weight loss of a tested coupon to calculate its average uniform corrosion rate. The coupon's susceptibility to localized form of attack such as pitting was evaluated by visual inspection under a low-power stereomicroscope.

The coupons were tested at temperatures of 250°, 400°, and 500° F. (121°, 204°, and 260° C.) using miniature (50 ml capacity) autoclaves that were lined with Teflon®. Each autoclave contained 27 milliliters of test solution and duplicate coupons. The coupons measured approximately 1.3 cm by 1.3 cm by 0.3 cm.

A two task experimental approach was used to provide examples of the effectiveness of this interaction. The first task involved evaluating additional candidate corrosion inhibitors in simulated environments, using electrochemical polarization techniques and coupon immersion tests. The second task involved testing of two selected inhibitors in separate chillers under actual operating conditions. The chillers were destructively examined for corrosion performance at the completion of the chiller testing.

Inhibitor Screening and Coupon Immersion Testing
Electrochemical Polarization Tests The solutions used for the electrochemical tests consisted of either 15 or 30 weight (wt.) percent ammonia in water plus one of the inhibitors listed in Table 1. The effectiveness of these compounds was tested on AISI C1018 carbon steel coupons by the use of an electrochemical technique called potentiodynamic polarization. This technique was used to quickly screen and compare the degree of passivation of carbon steel in presence of each of the inhibitors. The major criterion used for comparison was the magnitude of the critical current density observed on the polarization curve. The effectiveness of the inhibitor to suppress corrosion was judged to increase as the critical current density decreased.

Coupon immersion tests were started after the most promising inhibitors were identified by the electrochemical tests. The coupon immersion test is described in the following section.

TABLE 1

| INHIBITORS TESTED IN THE ELECTROCHEMICAL TESTS | |
|---|---|
| 15 wt. % Ammonia Solution and 0.2 wt. % Inhibitor | 30 wt. % Ammonia Solution and 0.2 wt. % Inhibitor |
| Potassium Permanganate (KMnO₄) | Sodium Aluminate (NaAlO₂) |
| Sodium Acetate (NaC₂H₃O₂.3H₂O) | Sodium Arsenate (NaAsO₃) |
| Sodium Antimonate (NaSbO₃) | Sodium Antimonate (NaSbO₃) |
| Sodium Benzoate (NaC₇H₃O₂) | Sodium Silicate (Na₂SiO₃) |
| Sodium Borate (Na₂BO₇.10H₂O) | Sodium Zincate (Na₂ZnO₂) |
| Sodium Nitrate (NaNO₃) | |
| Sodium Phosphate (Na₃PO₄.12H₂O) | |
| Sodium Plumbate (Na₂Pb(OH)₆) | |
| Sodium Silicate Na₂SiO₃ | |
| Sodium Titanate (Na₂Ti₃O₇) | |
| Sodium Vanadate (NaVO₃) | |

TASK 1 RESULTS

Electrochemical Tests

FIG. 1 shows two typical anodic polarization curves of C1018 carbon steel in uninhibited and inhibited ammonia solutions, for illustrative purposes. In FIG. 1, the active peak, the passive range and the solution breakdown and pitting regions are identified. An ideal inhibitor is expected to suppress anodic current densities over the entire active-passive region, to minimize the potential for corrosion. But, from a practical point of view, the most desirable performance expected from an inhibitor is at least a significant suppression of the active peak, for it represents the maximum (instantaneous) corrosion rate of the metal in the test solution. The values of critical current density, measured from the active peaks in the polarization curves of C1018 carbon steel, were determined for the various uninhibited and inhibited ammonia solutions. The additives which suppressed the critical current density (i.e. when compared to the uninhibited solution) in dilute (15 percent) ammonia solution were sodium antimonate, sodium plumbate, sodium silicate, and sodium vanadate. The others had an opposite effect and, therefore, these were considered not useful. Sodium plumbate and sodium vanadate, being salts of the heavy metals lead and vanadium, were considered environmentally unsafe, and these also were dropped from further consideration. Of the sodium silicate and sodium antimonate, the former produced the highest degree of suppression.

Figure 2:
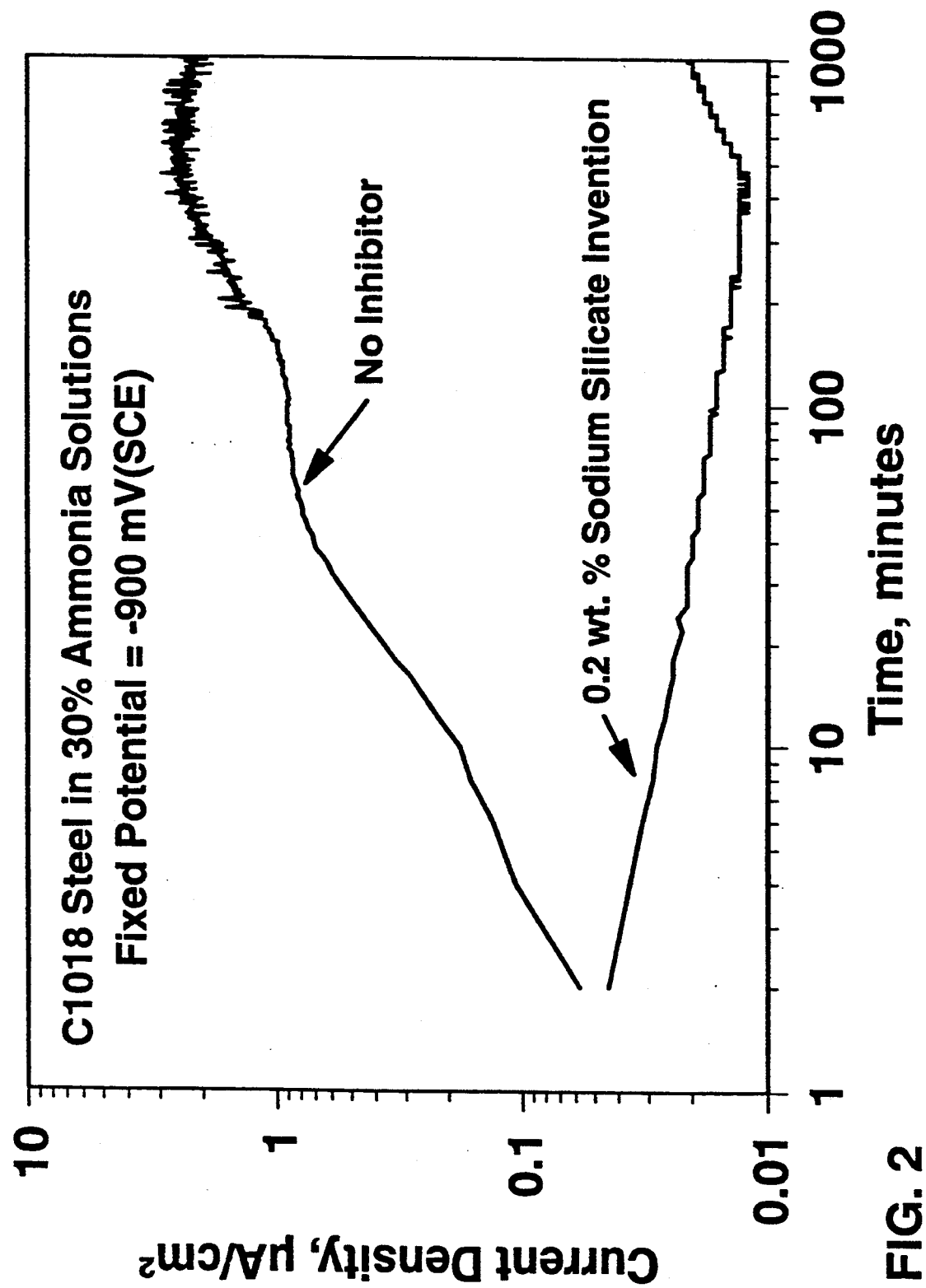
FIG. 2 reveals the current decay curves for C1018 carbon steel in 30% ammonia solutions without inhibitor and with sodium silicate inhibitor.

FIG. 2 shows the results of two polarization tests in which the potential of C1018 specimens was held constant at the anodic peak potential (i.e., $-900$ mV(SCE)) over 1000 minutes, while the current density was monitored. The objective of the test was to check somewhat longer term effect (as opposed to instantaneous effect) of the sodium silicate chemical in the concentrated ammonia solution. As observed, in the presence of 0.2 percent sodium silicate the current density was considerably lower, and generally decreased with time; whereas, in its absence, the current density increased with time. The results indicated that sodium silicate is a good corrosion inhibitor.

Coupon Immersion Tests

Figure 3:
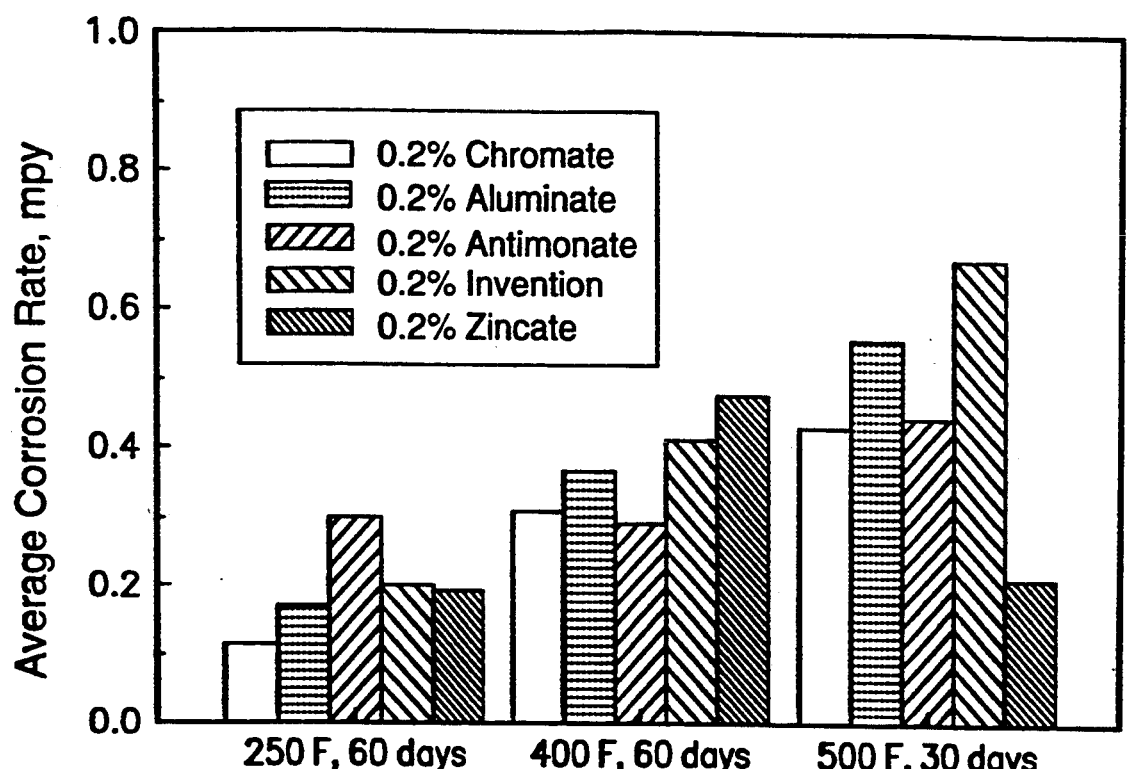
FIG. 3 discloses the corrosion rate of C1018 carbon steel in inhibited 30% ammonia water for 60 days at 250° and 400° F. (121° and 204° C.) and for 30 days at 500° F. (260° C.).
Figure 4:
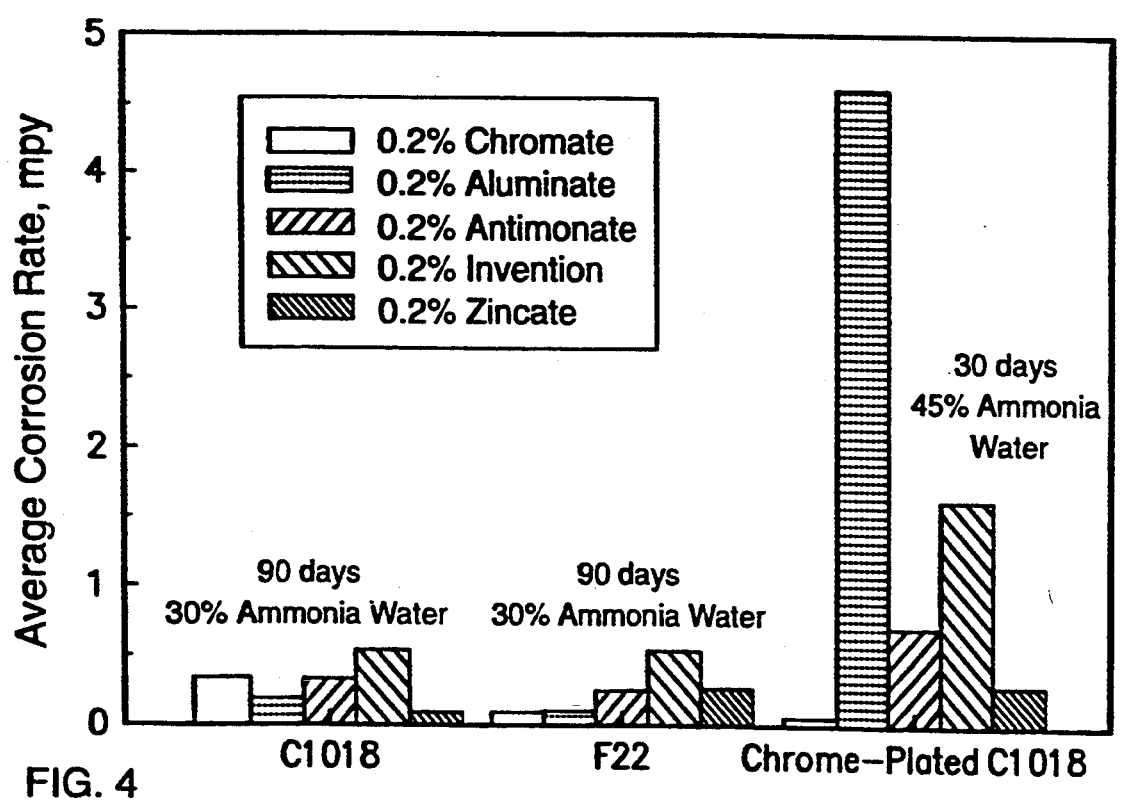
FIG. 4 discloses corrosion rate of C1018 carbon steel, Grade 22 low alloy steel (F22), and chrome-plated C1018 at 400° F. (204° C.) in inhibited ammonia-water solution.
Figure 5:
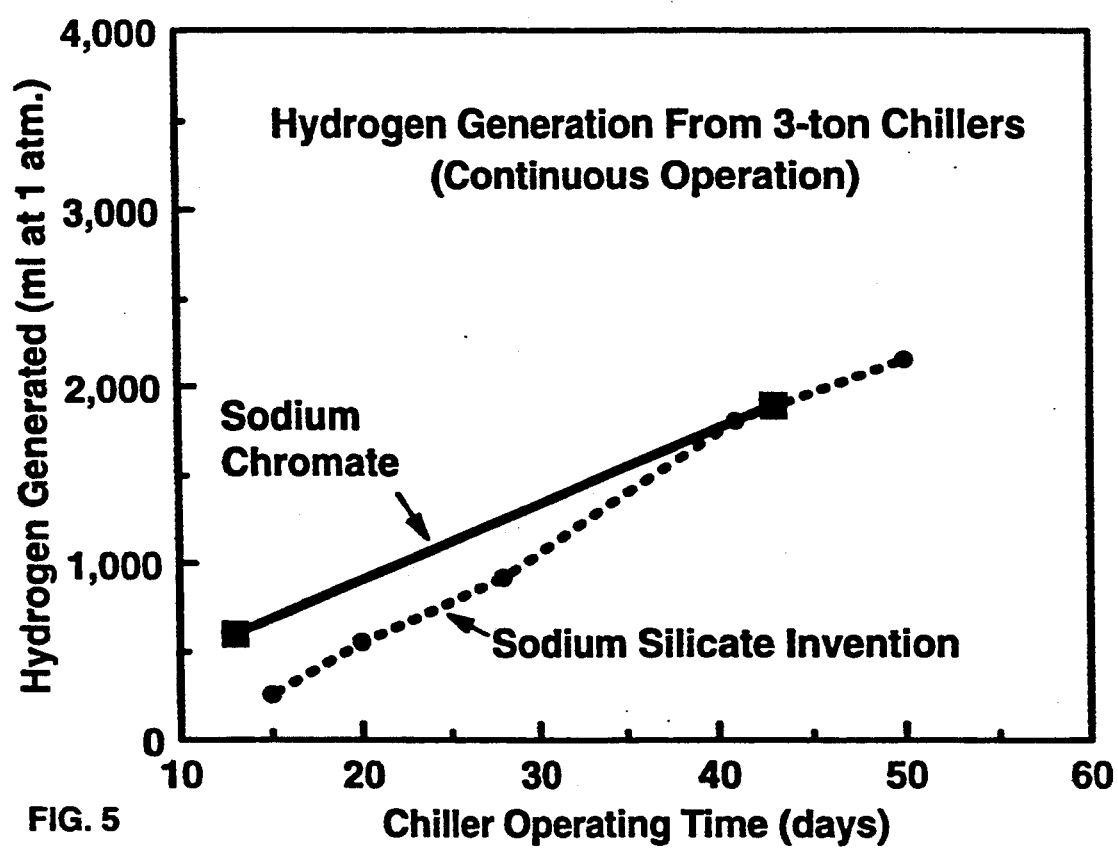
FIG. 5 discloses hydrogen gas volume collected from test chillers over different operating periods.

A summary of the results of the immersion tests for C1018 carbon steel, Grade 22 low alloy steel, and chrome-plated carbon steel are shown in FIGS. 3 and 4 for 250°, 400°, and 500° F. (121°, 204° and 260° C.) in 30 and 45 percent ammonia-water solutions. FIG. 3 shows the corrosion rates of C1018 carbon steel in 30 percent ammonia solutions for 60 days at 250° and 400° F. (121° and 204° C.) and at 500° F. (260° C.) for 30 days, inhibited with 0.2 percent chromate, 0.2 percent aluminate, 0.2 antimonate, 0.2 percent sodium silicate or 0.2% sodium zincate. The data show that the corrosion rates were less than 1 mpy (mils per year) in all the cases. However, as the temperature increased, the corrosion rate increased for C1018 carbon steel in all the solutions. The only clear exception appears to be for C1018 in 0.2 percent sodium zincate which exhibited a maximum corrosion rate at a 400° F. (204° C.). For each temperature investigated, none of the inhibitors appears to be superior to the others, except for sodium zincate at 500° F. (260° C.), which resulted in a corrosion rate of C1018 carbon steel at least one-half of the corrosion rate values for the other inhibitors.

FIG. 4 shows a comparison between the corrosion rates of C1018 carbon steel, Grade 22 low alloy steel, and chrome-plated C1018 carbon steel in 30 and 45 percent ammonia solutions after 30 and 90 days exposure in the presence of various inhibitors. There did not appear to be a significant difference between the corrosion rates of C1018 carbon steel and Grade 22 low alloy steel in the 30 percent solution after 90 days at 400° F. (204° C.). However, the chrome-plated carbon steel exhibited a much higher corrosion rate in 0.2 percent aluminate and 0.2 percent sodium silicate containing solutions after 30 days in the 45 percent ammonia solution. It is not clear if these greater rates were due to the shorter test period, greater ammonia concentration, or defects in the coating or a combination of all three. The chrome-plated carbon steel coupons tested for 30 days at 45 percent ammonia did not exhibit any corrosion in the 0.2 percent chromate solution which is consistent with its field performance.

TASK 2. EXPERIMENTAL APPROACH

Testing of Alternative Inhibitors in Chillers

Two 3-ton capacity ammonia-water absorption chillers, coupled to two vertical air-handlers, were used to test the alternative inhibitors selected in Task 1 of this program. The chillers were supplied by Dometic Corporation (now Robur Corporation) were identical to those that are sold for residential use except for the chemical pretreatment they were given. The standard pretreatment given to the components of the chiller's interior surfaces prior to their assembly is passivation in a sodium chromate bath. This pretreatment prevents rust from forming on the exposed steel surfaces of the chiller while they are in storage waiting for final assembly. The pretreatment given to the two chillers used in this test program was passivation in a sodium nitrate bath. Sodium nitrate was used in place of sodium chromate to prevent chromate from interfering or confounding the results of the alternative inhibitors planned for use in the chillers. One chiller (Ser. No. 100291) was charged with sodium zincate to a concentration of 0.2 wt. percent. The second chiller (Ser. No. 100292) was charged with sodium silicate chemical to a concentration of 0.2 wt. percent. The charging was done at Robur by the standard method they use to charge their chillers with sodium chromate. After the chillers were charged, and leak tested, they were subjected to continuous testing. Model number VFCF36-90 air handlers were used with the chillers. The chillers were run continuously in an ambient temperature range between 80° and 95° F. (27° and 35° C.).

Non-Condensable Gas Measurements

Non-condensable gas generated by the chillers was measured periodically by taking gas samples from a valve atop their respective purge tanks while the chillers were running. The gas was sampled using a 300 ml stainless steel sampling cylinder. The following procedure was used:

1. Evacuate sampling cylinder with a mechanical pump.
2. Weigh evacuated sampling cylinder.
3. Fill cylinder with gas from the purge tank valve on chiller.
4. Reweigh filled sampling cylinder.
5. Use sampling cylinder gas(es) to displace water in an inverted graduated glass cylinder.
6. Measure displaced water volume. (The displaced water volume equals the non-condensable volume. Any ammonia that is collected along with the non-condensable gas in Step 3 will be completely absorbed in the water during Step 5 and, therefore, would not contribute to the measured gas volume.)
7. Check measured gas volume against sampling cylinder weight gain using gas laws, while accounting for the possibility of ammonia in the sample.
8. Occasionally verify composition of collected gas by mass spectrometer.

Destructive Examination of Chillers

Selected components of the chillers were destructively examined after the chillers were run for 60 days. The components that were examined included the solution-cooled absorber, the solution restrictors, and the interior of the generator.

TASK 2 RESULTS

Non-condensable Gas Production

These results indicated that the sodium silicate inhibited chiller generated less or as much hydrogen as the standard chromate-inhibited chiller. The sodium zincate inhibited chiller however was generating hydrogen at a rate almost 20 times greater than either the sodium silicate or chromate inhibited chillers. The data indicated that the sodium silicate inhibited chiller, generated no greater amounts of hydrogen than did the standard chromate-inhibited chiller. The sodium zincate inhibited chiller, however, generated almost ten times greater amounts of hydrogen.

There are important distinctions that can be pointed out with regard to this invention. These include the higher temperature range at which the inhibitors were tested and the fact that the inhibitor was effective under simultaneous mass transfer as well as heat transfer conditions in the silicate-inhibited machine. The highest temperature mentioned in any of the other patents was 190° F. (88° C.; U.S. Pat. No. 4,098,720) whereas the invention inhibitor gave positive results up to 500° F. (260° C.).

The crucial distinctive aspect of this invention is the application of silicon compounds as corrosion inhibitors in aqueous ammonia solutions. The ammonia content makes a significant difference in solution chemistry. It can be shown that many inhibitors that function in aqueous systems (water only) will not function once ammonia is present in high concentrations. Therefore, this is not an obvious application of this previously known inhibitors.

It is herein understood that although the present invention has been specifically disclosed with the preferred embodiments and examples, modifications and variations of the concepts herein disclosed may be resorted to by those skilled in the art. The present invention may suitably comprise, consist of, or consist essentially of one or more corrosion-inhibiting, silicon compounds dissolved in an ammonia-water solution and the steps of charging the apparatus and dissolving the soluble silicon compound. Such modifications and variations are considered to be within the scope of the invention and the appended claims.

We claim:

1. A method of inhibiting corrosion of an apparatus employing ammonia-water absorption cycles comprising:
    (a) charging the apparatus with a solution of ammonia and water and
    (b) dissolving in said solution a silicon compound.

2. The method according to claim 1 wherein said silicon compound is selected from the group of silicon compounds consisting of alkali metal silicates, silicic acids, organic silicon compounds, and combinations thereof.

3. The method according to claim 2 wherein said silicon compound is an alkali metal silicate.

4. The method according to claim 3 wherein said alkali metal silicate is sodium silicate.

5. The method according to claim 3 wherein said alkali metal silicate is potassium silicate.

6. The method according to claim 1 wherein the temperature of said ammonia and water solution containing said soluble silicon compound is above about 200° F. (93° C.).

7. A method according to claim 1 wherein said ammonia is at least 15 percent by weight of said ammonia and water solution.

* * * * *